Feb. 19, 1952     O. L. TAYLOR     2,586,395
CIRCUIT CATHODE-RAY OSCILLOSCOPE
Filed Oct. 12, 1948
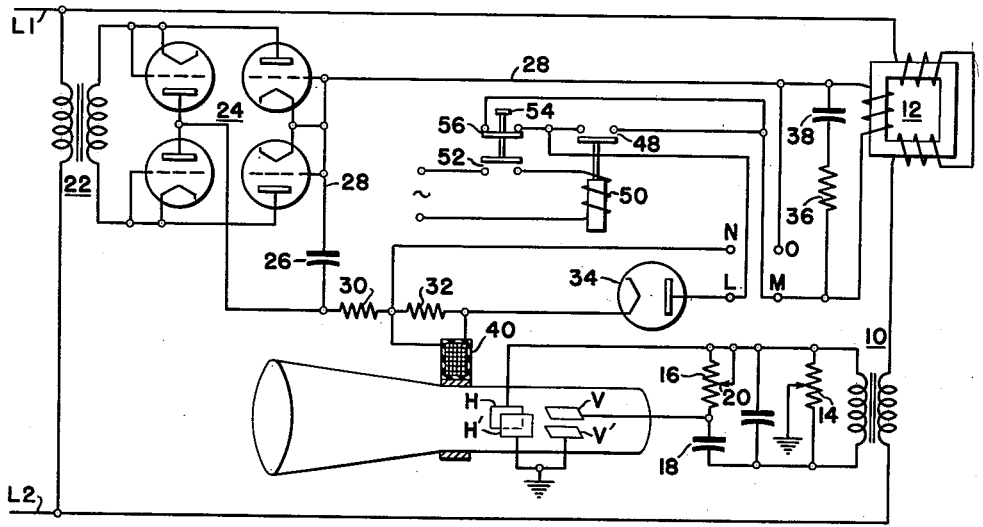
Fig.1.
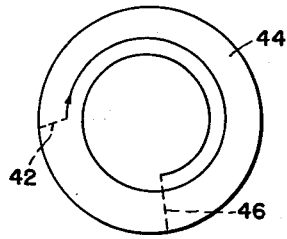   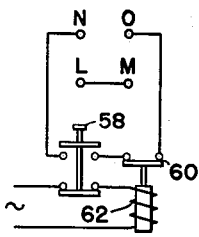   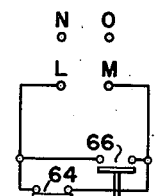   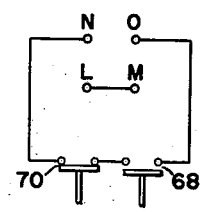
Fig.2.    Fig.3.    Fig.4.    Fig.5.
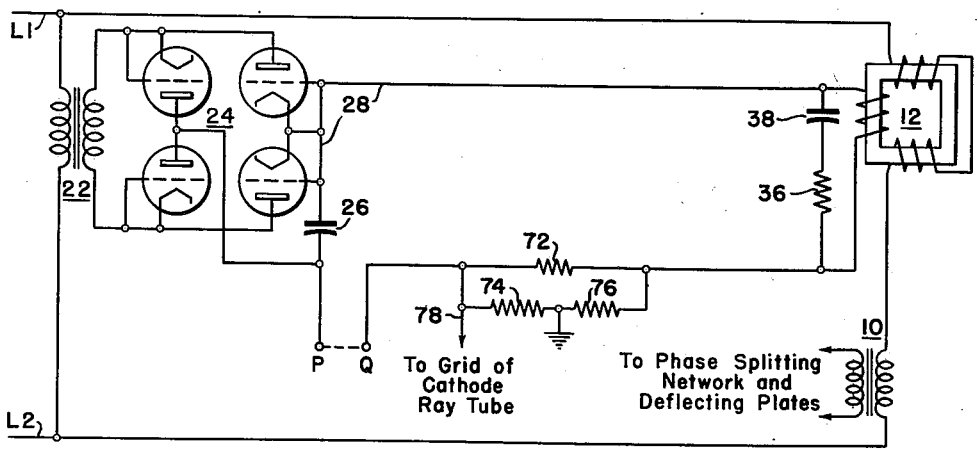
Fig.6.
WITNESSES:
Robert A. Baird
Nw. C. Groome
INVENTOR
Owen L. Taylor.
BY
F. E. Browder,
ATTORNEY Patented Feb. 19, 1952

2,586,395

UNITED STATES PATENT OFFICE 2,586,395

CIRCUIT CATHODE-RAY OSCILLOSCOPE

Owen L. Taylor, Beaver Falls, Pa., assignor to Westinghouse Electric Corporation, East Pittsburgh, Pa., a corporation of Pennsylvania Application October 12, 1948, Serial No. 54,103

8 Claims. (Cl. 315—24)

This invention relates to apparatus for the measurement of short time intervals, and particularly to the measurement of the time which elapses between operations involving the making and breaking of the same or different contacts or circuits in such devices as relays, contactors, circuit breakers, switches and the like.

It is an object of the invention to provide such an apparatus which will produce a visual display of the magnitude of the time interval being measured.

A further object of the invention is to provide such an apparatus in which the time to be measured is indicated by the length of a trace on the fluorescent screen of a cathode ray tube, and in which the trace length is not limited by the length of the longest straight trace which can be drawn across the tube screen. More particularly, it is an object of the invention to provide a cathode ray tube time indicator in which the indicating trace is of spiral form, so that several revolutions of the spiral may be viewed, where required, for the measurement of relatively long time intervals.

An additional object of the invention is to provide novel means for deflecting the trace of the cathode ray beam off of or away from the fluorescent screen during intervals between timing operations, for greater clarity in the display of the significant trace measuring the time between operations of the control contact circuits.

The above and other objects and advantages of the invention will best be understood from the following detailed specification of certain preferred embodiments thereof, taken in connection with the accompanying drawing, in which Figure 1 is a schematic wiring diagram of a preferred form of control circuit for the cathode ray indicator tube, Fig. 2 is a view illustrating the appearance of a timing trace upon the screen of a cathode ray tube, Figs. 3, 4 and 5 are diagrammatic illustrations of alternative connections to the measuring terminals of the timing apparatus, illustrating its use in measuring other types of time intervals, and Fig. 6 is a similar view of a modified form of control circuit.

In accordance with the invention a power supply and control circuits are provided for a cathode ray tube type of indicator having, for example, the usual horizontal and vertical deflection plates for controlling the deflection of a cathode ray beam generated in the tube in any desired or well-known manner. In addition, in one form of the invention, a deflecting coil or magnetic yoke structure, also well known as such, are provided about the neck of the cathode ray tube and are utilized for the radial control of the beam position in order to deflect it from the screen in accordance with the opening or closing of the contacts or circuits whose operation is to be studied. The control of the deflecting potentials applied to the horizontal and vertical deflecting plates, to achieve a spiral trace, is accomplished by means of a saturable reactor in series with the alternating power supply from which are obtained the quadrature voltages applied to the plates.

Referring now to Fig. 1 of the drawing, there is illustrated a control circuit obtaining its power from the usual 110 volt 60 cycle supply mains, designated L1 and L2. The usual rectangularly arranged horizontal and vertical deflecting plates of the cathode ray tube are designated H, H' and V, V' respectively. Two of these plates, for example, the ones marked H' and V', are connected to ground, and the other plates are connected to a phase-splitting network energized from the secondary of a supply transformer 10. The primary of this transformer is connected across mains L1 and L2 in series with one winding of a saturable reactor 12 whose saturation is controlled by the direct current passed through another winding thereof by arrangements to be described.

The phase splitting network mentioned above comprises a center-tapped resistor 14, across the secondary of transformer 10 and having its electrical center grounded. A series combination of resistor 16 and capacitor 18 is also connected across the secondary winding, the outer end of resistor 16 being connected to one plate, such as H of the tube deflecting electrodes, and the remaining plate V is connected between resistor 16 and capacitor 18, to provide voltages on these two plates which differ 90° in phase. A shunt connection 20 is provided to vary the amount of resistance of resistor 16 in the circuit, in order to equalize the magnitudes of the quadrature voltages obtained. It is clear from this description that the beam of cathode rays reaching the screen of the tube will travel in a circular path whose radius is governed by the voltage applied to the primary of transformer 10, and hence by the degree of saturation, or the impedance, of the saturable reactor 12. Thus, when the direct current through the saturating winding of reactor 12 is at its maximum, the impedance of the A. C. winding thereof is at a minimum, and the diameter of the trace on the screen will be at its maximum. However, by means to be described, the magnetic deflecting coil will at such times be receiving current, and hence the cathode ray beam will be further deflected so as to fall outside the screen, and will be invisible. The constants of the phase-splitting network connected to the tube deflecting plates are so chosen that the maximum diameter traced by the beam, when the magnetic deflecting yoke coil is de-energized, will provide a visible trace preferably of the largest visible diameter, on the screen.

In the above description, the quadrature voltages derived from the phase-splitting network have been treated as applied directly to the horizontal and vertical deflecting plates of the cathode ray tube. However, it is to be understood that such connections may be made through the intermediary of usual horizontal and/or vertical amplifiers, as used in standard types of cathode ray oscilloscopes.

The circuit components and connections shown in Fig. 1 for furnishing the necessary direct current for operation of the saturable reactor 12 comprise a supply transformer 22 whose primary winding is energized from A. C. lines L1 and L2, its secondary winding being applied to a conventional full-wave thyratron rectifier array designated generally by numeral 24. The direct current output of this rectifier is smoothed by a filter condenser 26, one of the output leads being connected to the saturating winding of reactor 12 as by connection 28, and the other lead passing through resistors 30 and 32 in series with a diode 34 or equivalent unilaterally conducting unit (such as a dry disc rectifier) to one of the control terminals designated "L." The opposite terminal "M" is connected to lead 28 through a resistor 36 and timing capacitor 38.

The coil 40 of the magnetic deflecting yoke (described above as located in usual beam deflecting position about the neck of the cathode ray tube) is connected across the resistor 32 in series with valve 34, and the common connection between resistors 30 and 32 is connected to a third control terminal herein designated "N." The remaining terminal "O" of the set of four control terminals is connected to lead 28 of the direct current supply to the saturable reactor 12.

It is clear from the above description that, whenever control terminals L and M are connected together, current flows continuously through the magnetic deflecting coil 40 and through the D. C. winding of saturable reactor 12, saturating its magnetic structure and presenting a minimum impedance to the current through transformer 10. However, the beam of the cathode ray tube will be further deflected off the screen, and will be invisible, due to the flow of direct current through the deflecting coil 40. Also, this flow of current through the D. C. winding of the saturable reactor will charge timing capacitor 38 to a voltage equal to the drop across said D. C. winding. When the circuit between control terminals L and M is opened, current ceases to flow through the deflecting coil, and the cathode ray beam assumes a radial position on the screen corresponding to maximum trace diameter, and proceeds to rotate due to the presence of voltages differing 90° in phase upon the deflecting plates of the tube. At the same time, the timing capacitor 38 commences to discharge through the path formed by resistor 36 and the D. C. winding of the saturable reactor, in the usual exponential fashion well understood in the art. The constants of capacitor 38 and resistor 36 are so chosen that the inductive effect of the D. C. winding of the reactor 12 may be neglected, and so that the decrease in current value approaches linearity for time lengths of the order being studied. As the current in the D. C. winding of the reactor decreases, therefore, the impedance of the A. C. winding thereof increases, thus gradually decreasing the current flow in the primary winding of transformer 10, and causing the trace of the cathode ray tube to spiral inwardly, as indicated by numeral 42 in Fig. 2, wherein numeral 44 designates the screen of the tube.

At the end of the time interval to be measured, when the circuit between terminals L and M is reclosed, current immediately flows through the deflection coil 40, and the trace is again deflected outside the maximum useful diameter of the screen 44, as at 46 in Fig. 2, and the other circuit components return to the conditions which obtained prior to the opening of the L—M circuit. If the material of screen 44 is of suitable persistance, the time between the opening and reclosing of the circuit between the control terminals can readily be measured in terms of the total angular length of the spiral trace on the screen; this time and the angular length are related by the simple expression $$T = \frac{1}{f} \times \frac{\theta}{360}$$

where T is the time interval in seconds, $f$ is the frequency of the A. C. supply, and $\theta$ is the total angular length of the visible trace.

If the terminals L and M are connected together, as by a jumper, the terminal N is then connected to either of these, the deflection coil is shorted out and a trace of the maximum diameter on the screen 44 is obtained. This connection is useful in adjusting the vertical and horizontal gains of the cathode ray tube, and the phase angle between the applied voltages so as to obtain a circular trace.

If now the circuit between terminals L and M is kept closed, and thereafter a second circuit is closed between terminals N and O, current also ceases to flow in the deflection coil, and the capacitor 38 again commences it discharge through the D. C. winding of reactor 12. Discharge of the capacitor through the deflection coil itself is prevented by valve 34. Thus, terminals N and O provide for initiating the timing period upon the closing of a circuit, rather than upon opening a circuit as in the case of terminals L and M.

The application of the above apparatus to one specific kind of problem is illustrated in Fig. 1, in which terminals L and M are arranged to be shorted by the normally open contacts 48 of a relay having an operating magnetic coil 50 energized through normally open contact 52 of a switch 54, which switch also has a normally closed pair of contacts 56 also connected across the relay contacts 48. The contact sets of switch 54 are preferably adjusted so that one set opens at precisely the same instant that the other closes. With the parts in the position shown in Fig. 1, it is clear that a depression of switch 54 will energize coil 50 and simultaneously open the circuit between terminals L and M of the oscilloscope circuit, thus initiating a spiral trace on the tube screen as above described. At some later time dependent upon the characteristics of the relay being tested, its contacts 48 will close, thus reclosing the circuit between terminals L and M and terminating the spiral trace. The length of the total trace will therefore give an accurate measure of the pull-up time of the relay.

If it is desired to measure the time between the opening of one external circuit and the subsequent opening of another, an arrangement indicated in Fig. 3 may be utilized. In this circuit, terminals L and M are permanently connected by a jumper, and terminals N and O are connected through the normally open contacts of the starting switch 58 and the normally open contacts 60 of a relay whose coil 62 is connected to the supply line via the normally closed contacts of the starting switch 58. The coil 62 is thus energized, and contacts 60 are closed, until the coil circuit is opened by an operation of switch 58, which simultaneously completes the circuit to terminals N and O and initiates the timing cycle trace. At a later time dependent upon the characteristics of the relay under test, its contacts 60 will open and terminate the timing trace, the delay in such opening being indicated by the length of the trace.

Fig. 4 illustrates an arrangement for measuring the time interval between the opening of one set of contacts 64 and the closing of another set of contacts 66. The contact sets are merely connected in parallel across terminals L and M, so that the opening of contacts 64 initiates the timing cycle, while the subsequent closing of contacts 66 recloses the circuit and terminates the trace. Similarly, in Fig. 5, wherein the contact sets 68 and 70 are connected in series across terminals N and O, the time between a closure of contacts 68 and the opening of the other contacts 70 will be indicated. Other uses of the control terminal circuits will be obvious to those skilled in the art.

The following values for the circuit components shown in Fig. 1 have been found satisfactory for measuring the characteristics of usual forms of relays and contactors:

| | | |
|---|---|---|
| Resistor 14 | ohms | 120,000 |
| Resistor 16 | do | 50,000 |
| Resistor 30 | do | 10,000 |
| Resistor 32 | do | 5,000 |
| Resistor 36 | do | 1,200 |
| Capacitor 18 | mfd | .25 |
| Capacitor 38 | mfd | 30 |

Fig. 6 of the drawings illustrates a modification of the circuit of Fig. 1, in which extinction of the beam is controlled by the application of a potential drop developed across a series resistor in the control circuit, applied to the control grid of the cathode ray tube, rather than by the use of magnetic deflecting coil at the tube. In Fig. 6, the parts which are duplicated as in Fig. 1 have been given the same reference numerals, including the timing capacitor 38 and its resistor 36. It will be understood that the same connections are made from the secondary of transformer 10 to the phase splitting network and cathode ray tube horizontal and vertical deflecting plates as were utilized in the Fig. 1 arrangement.

In Fig. 6, a single pair of control terminals, marked P and Q, are shown as included in a series circuit with resistor 72 and the circuit to the timing resistor-capacitor circuit placed across the D. C. or saturating winding of the saturable reactor 12. It is clear that when terminals P and Q are connected together, as by an external circuit including a pair of contacts, then condenser 38 charges up to the full voltage drop across the D. C. winding of the reactor 12, and a high negative potential will be placed on the grid of the cathode ray tube via connection 78 (either directly, or through an appropriate amplifier), and hence the cathode ray beam will be prevented from reaching the screen of the tube. When the connection between terminals P and Q is again broken, the control grid will rise to a positive potential determined by the network of resistors 74 and 76, and the trace will become visible for such time as terminals P and Q are disconnected from one another. Reclosure of the circuit at these terminals will again extinguish the trace, leaving the cathode ray tube screen with the visible trace as shown in Fig. 2.

I claim as my invention:

1. A measuring circuit comprising a cathode ray tube having a screen, means for applying equal quadrature voltages to the deflecting electrodes of said tube, variable impedance means including a saturable reactor for varying the amplitudes of said quadrature voltages equally in a continuous manner, means for initiating the operation of said variable impedance means, and means operable simultaneously with said initiating means for controlling the impingement of the cathode ray beam upon said screen.

2. A time measuring oscilloscope comprising a cathode ray tube having a screen and means for directing a beam of cathode rays toward said screen, deflecting electrodes for said tube, a source of alternating current, means including a transformer for deriving from said source potentials adapted to deflect said beam in a circular path, means connecting the last named means with said deflecting electrodes, variable impedance means in series with a winding of said transformer, a condenser-resistor circuit for controlling the impedance of said variable impedance means, a pair of control terminals in the charging circuit of said condenser-resistor circuit, a resistor in said charging circuit, a beam deflecting coil connected across said resistor and arranged in inductive relationship to said tube, and electric valve means connected in said charging circuit to prevent discharge of said condenser through said coil or said resistor.

3. An oscilloscope comprising a cathode ray tube, a source of alternating potential, means for deriving deflection potentials from said source and for applying said potentials to deflecting electrodes of said tube, variable impedance means including a saturable reactor interposed between said source and said potential-deriving means, and a voltage decay circuit connected to said variable impedance means to control the impedance thereof.

4. An oscilloscope comprising a cathode ray tube, a source of alternating potential, means for deriving deflection potentials from said source and for applying the same to electrodes of said tube, variable impedance means interposed between said source and said potential-deriving means, a control circuit for said variable impedance means, a deflecting coil for said cathode ray tube, a source of direct current for energizing said control circuit, and a pair of control terminals interposed in a series circuit connecting said control circuit, said deflecting coil and said source of direct current, said terminals when disconnected from one another serving to isolate said control circuit and said deflection coil from said source of direct current.

5. In a cathode ray oscilloscope, a cathode ray tube, an alternating current source, means including a transformer for deriving deflecting potentials from said source, a saturable reactor in series with said transformer, a source of direct current, and two pairs of control terminals; a series circuit including said source of direct current, the saturating winding of said reactor, one pair of said terminals, and a dropping resistor; a decay circuit in shunt with said saturating winding, a beam deflecting coil across said dropping resistor, and a second series circuit including said second pair of terminals and connected in shunt to said decay circuit, said first pair of terminals, said dropping resistor and said deflecting coil.

6. The invention in accordance with claim 1, in which said controlling means comprises a circuit controlling the flow of deflection current in an ancillary coil associated with said cathode ray tube.

7. The invention in accordance with claim 1, in which said controlling means comprises a circuit controlling the application of biasing potential to a grid of said cathode ray tube.

8. An oscilloscope comprising a cathode ray tube, a source of alternating potential, means for deriving deflection potentials from said source and for applying said potentials to deflecting electrodes of said tube, variable impedance means including a saturable reactor interposed between said source and said potential-deriving means, and a condenser-resistor decay circuit connected to said variable impedance means for varying the impedance thereof in a substantially linear manner.

OWEN L. TAYLOR.

REFERENCES CITED

The following references are of record in the file of this patent:

UNITED STATES PATENTS

| Number | Name | Date |
| --- | --- | --- |
| 2,272,842 | Hickok | Feb. 10, 1942 |
| 2,307,237 | Rea et al. | Jan. 5, 1943 |
| 2,408,414 | Donaldson | Oct. 1, 1946 |
| 2,408,415 | Donaldson | Oct. 1, 1946 |
| 2,449,792 | Snyder, Jr. | Sept. 21, 1948 |

FOREIGN PATENTS

| Number | Country | Date |
| --- | --- | --- |
| 406,903 | Great Britain | Mar. 8, 1934 |